United States Patent
Ito

(10) Patent No.: US 8,519,560 B2
(45) Date of Patent: Aug. 27, 2013

(54) POWER LINE COMMUNICATION DEVICE

(75) Inventor: Masakazu Ito, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 719 days.

(21) Appl. No.: 12/527,579

(22) PCT Filed: Nov. 30, 2007

(86) PCT No.: PCT/JP2007/073144
§ 371 (c)(1),
(2), (4) Date: Aug. 18, 2009

(87) PCT Pub. No.: WO2008/102496
PCT Pub. Date: Aug. 28, 2008

(65) Prior Publication Data
US 2011/0204726 A1      Aug. 25, 2011

(30) Foreign Application Priority Data

Feb. 19, 2007 (JP) ................................. 2007-037533

(51) Int. Cl.
*H02J 3/02* (2006.01)
*H02J 3/34* (2006.01)

(52) U.S. Cl.
USPC ....... 307/3; 307/4; 307/5; 307/6; 340/310.11; 340/538.11

(58) Field of Classification Search
USPC ........................ 307/3, 1; 340/310.11, 538.11
See application file for complete search history.

(56) References Cited

U.S. PATENT DOCUMENTS

| | | | | |
|---|---|---|---|---|
| 5,787,132 A * | 7/1998 | Kishigami et al. | ............ | 375/354 |
| 7,466,225 B2 * | 12/2008 | White et al. | .................. | 340/538 |
| 7,764,943 B2 * | 7/2010 | Radtke | .......................... | 455/402 |
| 2003/0185027 A1 | 10/2003 | Yokoo et al. | | |
| 2005/0169056 A1 * | 8/2005 | Berkman et al. | ......... | 365/185.22 |
| 2005/0254515 A1 | 11/2005 | Suzuki et al. | | |
| 2006/0129851 A1 | 6/2006 | Will et al. | | |
| 2006/0145535 A1 * | 7/2006 | Kaneko | ............................. | 307/1 |
| 2007/0091925 A1 * | 4/2007 | Miyazaki et al. | ............. | 370/469 |
| 2007/0108840 A1 * | 5/2007 | Amada et al. | .................. | 307/9.1 |
| 2008/0067997 A1 * | 3/2008 | Miyata et al. | ................. | 323/318 |
| 2009/0041438 A1 * | 2/2009 | Kuno | ............................ | 386/126 |

FOREIGN PATENT DOCUMENTS

| | | | |
|---|---|---|---|
| CN | 1783942 A | | 6/2006 |
| EP | 1655858 | * | 10/2005 |
| EP | 1 655 858 A2 | | 5/2006 |
| JP | 8-288074 A | | 11/1996 |
| JP | 2003-46417 A | | 2/2003 |
| JP | 2003-78457 A | | 3/2003 |

(Continued)

*Primary Examiner* — Rexford Barnie
*Assistant Examiner* — Toan Vu
(74) *Attorney, Agent, or Firm* — Birch, Stewart, Kolasch & Birch, LLP

(57) ABSTRACT

A power line communication device achieving suppression of electric power consumption is provided. Processing performed by a CPU of a PLC adapter includes the steps of sensing that a time to cut off electric power supply has come (S610), generating a message notifying that electric power supply will be cut off (S620), transmitting the message to equipment connected to the PLC adapter (S630), and emitting a command to cut off electric power supply to an RJ45 connector to a power feed circuit (S680) when a confirmation signal with regard to cut-off of electric power supply is received from the equipment (YES in step S640) and when cut-off OK is indicated (YES in step S650).

17 Claims, 21 Drawing Sheets

(56) References Cited

FOREIGN PATENT DOCUMENTS

| | | |
|---|---|---|
| JP | 2003-298477 A | 10/2003 |
| JP | 2005-275684 A | 10/2005 |
| JP | 2005-323301 A | 11/2005 |
| JP | 2006-100939 A | 4/2006 |
| JP | 2006-148593 A | 6/2006 |
| JP | 2008-182626 A | 8/2008 |

* cited by examiner

POWER LINE COMMUNICATION DEVICE

TECHNICAL FIELD

The present invention relates to a power line communication device, and more particularly to a technique for suppressing electric power consumption in the power line communication device.

BACKGROUND ART

Communication using a power line laid in a house (power line communication) has been known. Specifically, communication through a device having a power line communication modem for carrying a signal on the power line and extracting the signal is carried out.

For example, Japanese Patent Laying-Open No. 2003-078457 (Patent Document 1) discloses a power line communication device not requiring a cable dedicated for power supply. In addition, Japanese Patent Laying-Open No. 2006-100939 (Patent Document 2) discloses a technique for realizing power line communication with simplified configuration, with a connection operation being facilitated.

Patent Document 1: Japanese Patent Laying-Open No. 2003-078457
Patent Document 2: Japanese Patent Laying-Open No. 2006-100939

DISCLOSURE OF THE INVENTION

Problems to be Solved by the Invention

According to the technique disclosed in Japanese Patent Laying-Open No. 2003-078457 or Japanese Patent Laying-Open No. 2006-100939, however, electric power is constantly consumed and power saving was not achieved.

The present invention was made to solve the above-described problems, and an object of the present invention is to provide a power line communication device achieving suppressed electric power consumption.

Means For Solving the Problems

In order to solve the above-described problems, a power line communication device according to one aspect of the present invention includes: a power supply unit for receiving electric power supply through a power line and transmitting and receiving a signal; a terminal unit for supplying the electric power to the outside of the power line communication device and transmitting and receiving a signal; a conversion unit for modulating and demodulating the signal transmitted between the power line and the terminal unit; a sensing unit for sensing that a condition for starting an operation to suppress electric power consumption in the power line communication device is satisfied; and an electric power control unit for suppressing electric power consumption in the power line communication device based on the condition being satisfied.

Preferably, the conversion unit operates in accordance with at least any of a first operation mode of operation without restriction on the electric power consumption and a second operation mode of operation under restriction on the electric power consumption. The electric power control unit switches the operation mode of the conversion unit from the first operation mode to the second operation mode.

Preferably, the electric power control unit generates a command for suppressing electric power consumption based on the condition being satisfied and emits the command to the terminal unit.

Preferably, the electric power control unit cuts off electric power supply from the power supply unit to the terminal unit.

Preferably, the power line communication device further includes a change detection unit for detecting change in an environment of the power line communication device. The sensing unit senses the condition being satisfied, based on detection of change in the environment.

Preferably, the change detection unit includes a sensor for detecting a temperature. The sensing unit senses the condition being satisfied, based on detection of temperature change in the environment of the power line communication device.

Preferably, the change detection unit includes a sensor for detecting sound. The sensing unit senses the condition being satisfied, based on a level of sound around the power line communication device being equal to or lower than a level defined in advance.

Preferably, the power line communication device further includes a time counting unit for counting time. The sensing unit senses the condition being satisfied, based on the time counted by the time counting unit.

Preferably, the sensing unit senses the condition being satisfied, every predetermined time.

Preferably, the sensing unit senses the condition being satisfied, every predetermined time period.

Preferably, the power line communication device further includes a transmission amount measurement unit for measuring an amount of data transmitted in the power line communication device. The sensing unit senses the condition being satisfied, based on change in the amount of transmission in the power line communication device.

Preferably, the sensing unit senses the condition being satisfied, based on absence of transmission of the data between the terminal unit and the conversion unit.

Preferably, the sensing unit senses the condition being satisfied, based on lapse of a predetermined prescribed time since absence of transmission of the data.

Preferably, the power line communication device further includes an input unit for accepting a command to the power line communication device. The sensing unit senses the condition being satisfied, based on the command to suppress consumption being provided to the input unit.

Preferably, the input unit further includes a manipulation unit for accepting manipulation of the power line communication device. The sensing unit senses the condition being satisfied, based on manipulation being provided to the power line communication device.

Preferably, the input unit includes a reception unit for receiving a signal to the power line communication device. The sensing unit senses the condition being satisfied, based on reception by the reception unit of a signal including the command to suppress electric power consumption.

Preferably, the reception unit receives a signal transmitted through the power line.

Preferably, the reception unit receives a signal input to the power line communication device through the terminal unit. The received signal includes information indicating that equipment receiving electric power supply through the terminal unit accepts suppression of electric power consumption. The sensing unit senses the condition being satisfied, based on reception of the information.

Effects of the Invention

According to the present invention, electric power consumption in the power line communication device can be suppressed.

Figure 1:
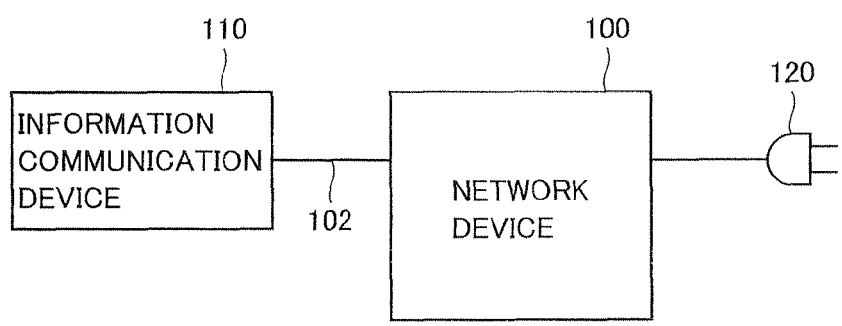
FIG. 1 is a diagram illustrating an overview of a system configuration of a communication system 10 according to an embodiment of the invention.

DESCRIPTION OF THE REFERENCE SIGNS 10, 20 communication system; 102 cable; 120, 350 plug; 323, 324 physical layer interface; 370a, 370b LED; 700, 1200 packet; 800 computer system; 862 optical disc; 1310 cable; and 1320 wall outlet.

BEST MODES FOR CARRYING OUT THE INVENTION

An embodiment of the present invention will be described hereinafter with reference to the drawings. In the description below, the same elements have the same reference characters allotted. Their label and function are also identical. Therefore, detailed description thereof will not be repeated.

First Embodiment

Initially, referring to FIG. 1, a communication system 10 according to an embodiment of the present invention will be described. FIG. 1 is a diagram illustrating an overview of a system configuration of communication system 10. Communication system 10 includes a network device 100 and an information communication device 110. Network device 100 and information communication device 110 are connected to each other through a cable 102. Network device 100 includes a plug 120 for receiving electric power supply through a power line (not shown). Cable 102 is, for example, a cable used for wiring Ethernet®. Specifically, a technique known as what is called "Power over Ethernet®" realizes communication of a signal and electric power supply. It is noted that communication and electric power supply may be realized under other specifications.

Figure 2:
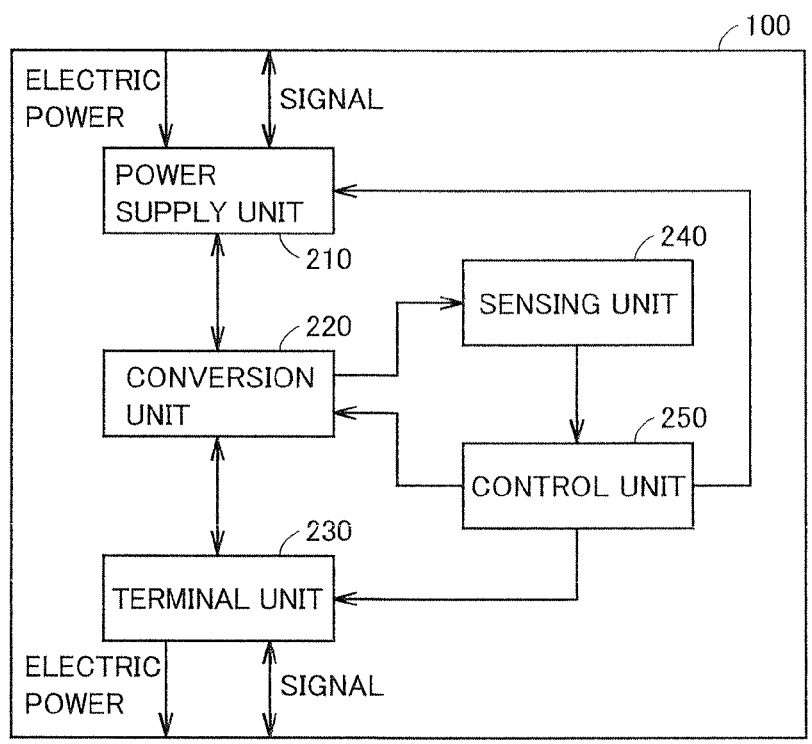
FIG. 2 is a block diagram illustrating a function attained by a network device 100.

Referring to FIG. 2, a configuration of network device 100 will be described. FIG. 2 is a block diagram illustrating a function realized by network device 100. Network device 100 includes a power supply unit 210, a conversion unit 220, a terminal unit 230, a sensing unit 240, and a control unit 250.

Power supply unit 210 receives electric power supply through the power line and transmits and receives a signal to/from the power line. Conversion unit 220 is connected to power supply unit 210 such that it can transmit and receive a signal. Conversion unit 220 modulates and demodulates a signal transmitted between power supply unit 210 and terminal unit 230. Terminal unit 230 is connected to conversion unit 220 such that it can transmit and receive a signal. Terminal unit 230 further supplies electric power to information communication device 110 connected to network device 100. Terminal unit 230 communicates a signal with information communication device 110.

Sensing unit 240 is configured to be operable based on an output from conversion unit 220. Sensing unit 240 senses that a condition for starting an operation to suppress electric power consumption in network device 100 is satisfied. In one aspect, sensing unit 240 senses that the condition is satisfied based on detection of change in an environment of network device 100. More specifically, sensing unit 240 senses that the condition is satisfied, based on detection of temperature change around network device 100. In another aspect, sensing unit 240 senses that the condition is satisfied, based on the fact that a level of sound around network device 100 is equal to or lower than a level defined in advance. Sensing unit 240 senses that the condition is satisfied, based on a time counted within network device 100. Sensing unit 240 senses that the condition is satisfied, every predetermined time. Alternatively, in another aspect, sensing unit 240 senses that the condition is satisfied, every predetermined time period.

Control unit 250 controls an operation of hardware constituting network device 100. More specifically, control unit 250 is configured to be operable based on an output from sensing unit 240. Control unit 250 suppresses electric power consumption in network device 100 based on sensing by sensing unit 240 that the condition is satisfied.

In one aspect, conversion unit 220 operates in accordance with at least any of a first operation mode of operation without restriction on electric power consumption and a second operation mode of operation under restriction on electric power consumption. Control unit 250 switches the operation mode of conversion unit 220 from the first operation mode to the second operation mode. In one aspect, control unit 250 generates a command for suppressing electric power consumption based on the fact that the condition is satisfied. Control unit 250 emits the command to terminal unit 230.

In another aspect, control unit 250 prohibits supply to terminal unit 230, of electric power supplied from the power line through power supply unit 210. For example, control unit 250 prohibits electric power supply to the outside of network device 100 through terminal unit 230, by turning off a switch (not shown) provided between power supply unit 210 and terminal unit 230.

Figure 3:
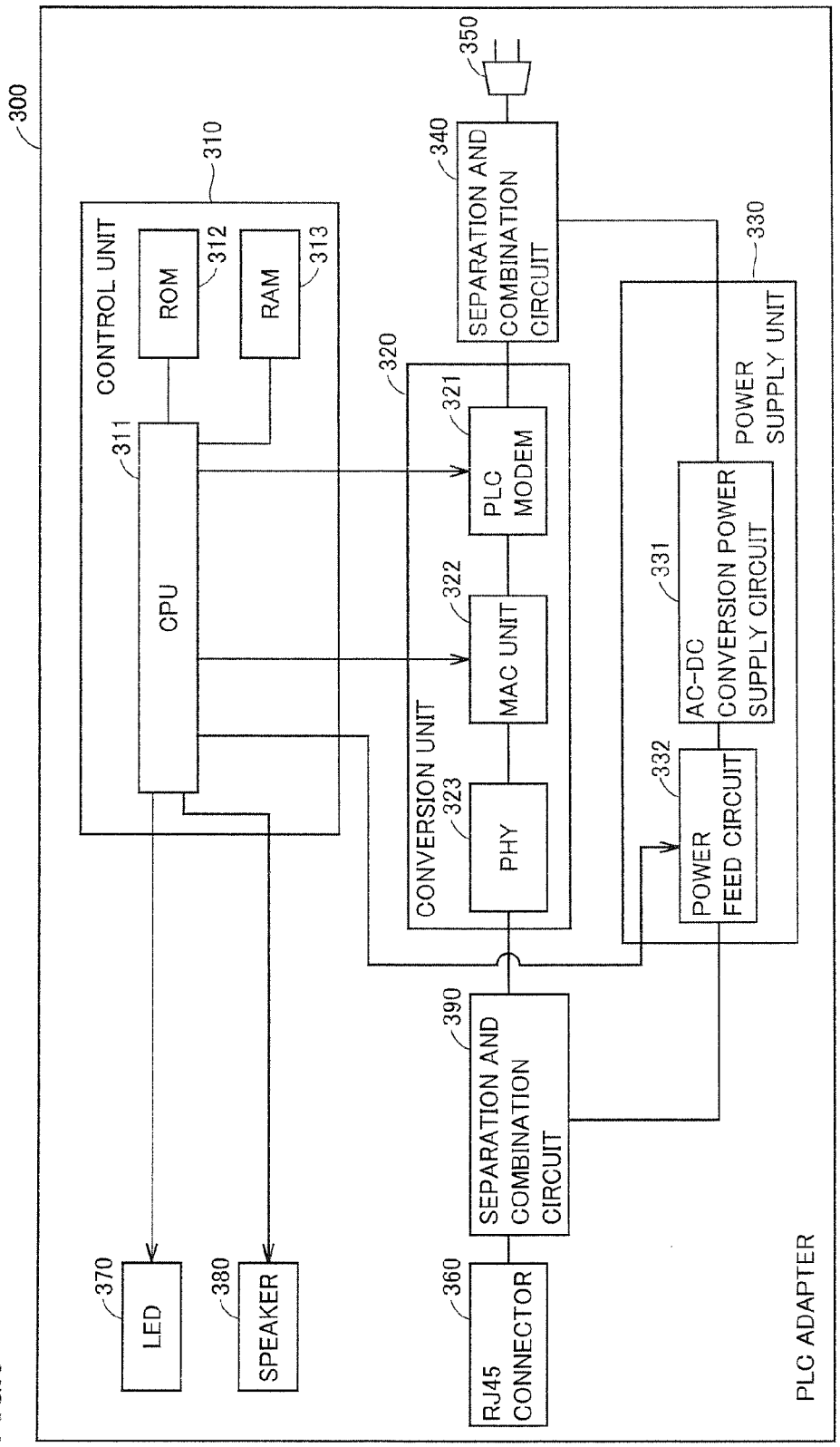
FIG. 3 is a block diagram illustrating a hardware configuration of a PLC (Power Line Communication) adapter 300 functioning as network device 100.

Referring next to FIG. 3, a specific configuration of network device 100 will be described. FIG. 3 is a block diagram illustrating a hardware configuration of a PLC (Power Line Communication) adapter 300 functioning as network device 100. PLC adapter 300 includes a control unit 310, a conversion unit 320, a power supply unit 330, separation and combination circuits 340, 390, a plug 350, an RJ45 connector 360, an LED (Light Emitting Diode) 370, and a speaker 380.

Control unit 310 functions as control unit 250 in FIG. 2. More specifically, control unit 310 includes a CPU (Central Processing Unit) 311, a ROM (Read Only Memory) 312, and a RAM (Random Access Memory) 313. Conversion unit 320 includes a PLC modem 321, a MAC (Media Access Control) unit 322, and a physical layer interface 323. Power supply unit 330 includes an AC-DC (Alternating Current-Direct Current) conversion power supply circuit 331 and a power feed circuit 332. It is noted that ROM 312 includes a rewritable memory device such as a flash memory.

CPU 311 controls an operation of PLC adapter 300 based on data stored in ROM 312 or RAM 313 and a program held in advance in ROM 312. In one aspect, CPU 311 controls an operation of conversion unit 320. In another aspect, CPU 311 controls an operation of power supply unit 330. CPU 311 causes LED 370 to perform a light-emission operation in a color defined in advance, by emitting a command to LED 370. In another aspect, CPU 311 causes speaker 380 to output sound defined in advance.

ROM 312 stores a program and data prepared for causing PLC adapter 300 to perform an operation defined in advance. A structure of the data will be described later. RAM 313 temporarily holds data or a command generated by CPU 311.

In conversion unit 320, PLC modem 321 modulates or demodulates an input signal and outputs the modulated or demodulated signal. MAC unit 322 carries out control for transmitting a signal output from PLC modem 321 to physical layer interface 323, based on a command output from CPU 311. For example, MAC unit 322 emits data in accordance with CSMA/CD (Carrier Sense Multiple Access With Collision Detection). Physical layer interface 323 defines, for example, a physical, electrical or logical interface condition of a DTE (Data Terminal Equipment)/DCE (Data Circuit-terminating Equipment) interface. Physical layer interface 323 is connected to RJ45 connector 360 with separation and combination circuit 390 being interposed.

In power supply unit 330, AC-DC conversion power supply circuit 331 converts AC power supply output from separation and combination circuit 340 to DC power supply and supplies resultant electric power to power feed circuit 332. Power feed circuit 332 supplies electric power to RJ45 connector 360 through separation and combination circuit 390, in accordance with the command output from CPU 311.

Separation and combination circuit 390 superimposes a signal output from physical layer interface 323 and electric power supplied from power feed circuit 332 on each other and outputs the resultant signal to RJ45 connector 360. In addition, separation and combination circuit 390 transmits a signal sent from RJ45 connector 360 to physical layer interface 323.

Plug 350 is inserted in a wall outlet (not shown) provided in a room where PLC adapter 300 is installed and receives electric power supply through the power line. In addition, plug 350 can receive a signal transmitted from another information communication device (not shown) through the power line and transmit a signal to another information communication device. Another information communication device includes, for example, a computer connected to a PLC adapter similar to PLC adapter 300.

Separation and combination circuit 340 separates electric power from the signal output from plug 350 and supplies the electric power to power supply unit 330. Separation and combination circuit 340 transmits the signal to conversion unit 320. In contrast, separation and combination circuit 340 transmits the signal transmitted from PLC modem 321 to plug 350.

LED 370 emits light in a predetermined color or in a blinking pattern, based on the command from CPU 311. The light emission color or the blinking pattern of LED 370 is defined in advance for notification of an operation state of PLC adapter 300. This definition information is stored, for example, in ROM 312. LED 370 is configured to emit light, for example, in each color of RGB (Red, Green, Blue). Alternatively, LED 370 may illuminate in a single color.

Speaker 380 outputs sound defined in advance, in accordance with the operation state of PLC adapter 300. A manner of output of sound (output pattern, volume, or the like) is defined in advance in ROM 312.

Figure 4:
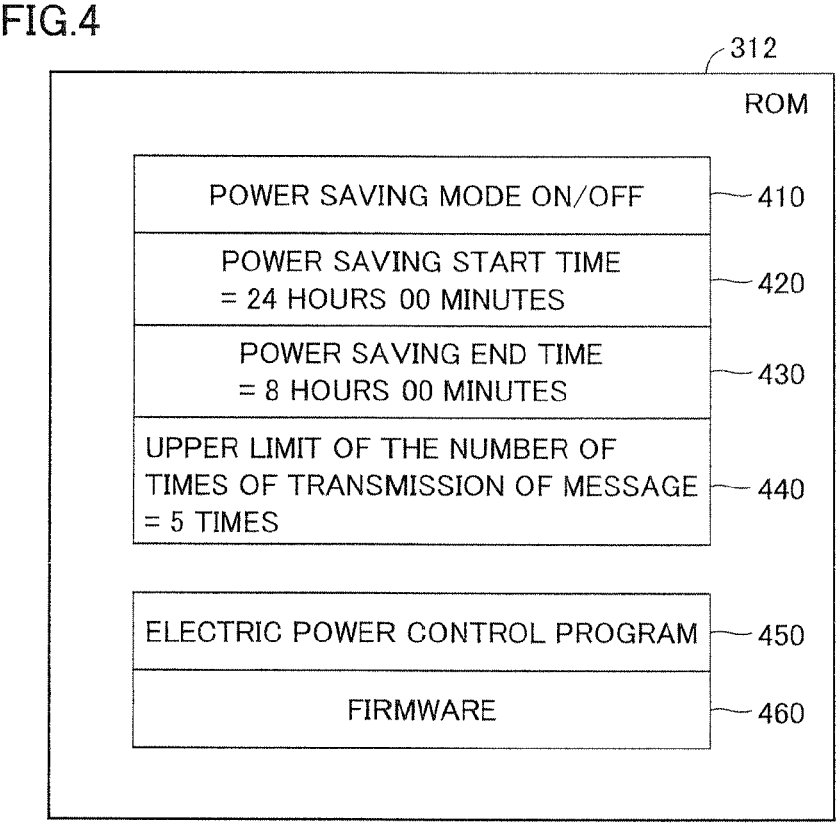
FIG. 4 is a diagram conceptually illustrating one form of storage of data in a ROM 312 included in PLC adapter 300.

Referring next to FIG. 4, a data structure of PLC adapter 300 will be described. FIG. 4 is a diagram conceptually illustrating one form of storage of data in ROM 312 included in PLC adapter 300. ROM 312 includes a plurality of memory areas for storing data.

Data defining whether PLC adapter 300 is to operate in a power saving mode or not is stored in a memory area 410. The time to start an operation in the power saving mode is stored in a memory area 420. The time to end that operation is stored in a memory area 430. The upper limit value of the number of times of transmission by PLC adapter 300 of a confirmation message to equipment of which power saving is intended is stored in a memory area 440.

Here, in the present embodiment, the power saving mode refers to an operation mode in which electric power consumption is suppressed in the inside of PLC adapter 300 or in another information communication device connected to PLC adapter 300. Suppression of electric power consumption includes cut-off of electric power supply to a specific element among a plurality of elements constituting PLC adapter 300 or to another information communication device above. Therefore, in the present embodiment, the power saving mode can also be referred to as a mode in which PLC adapter 300 or another information communication device operates with an operation voltage lower than a normal operation voltage. Description will be given hereinafter, assuming that electric power supply is cut off.

An electric power control program for CPU 311 to perform processing for power saving is stored in a memory area 450. Firmware for performing a basic operation of PLC adapter 300 (ordinary signal modulation and demodulation processing, turning-on of LED 370, and other operations) is stored in a memory area 460. CPU 311 reads the data or the program stored in each memory area and performs the processing in accordance with the program.

It is noted that the data stored in ROM 312 may be rewritable, in accordance with input to PLC adapter 300. For example, a configuration may be such that a user of PLC adapter 300 inputs data through plug 350 or RJ45 connector 360 and the data is written in ROM 312.

Figure 5:
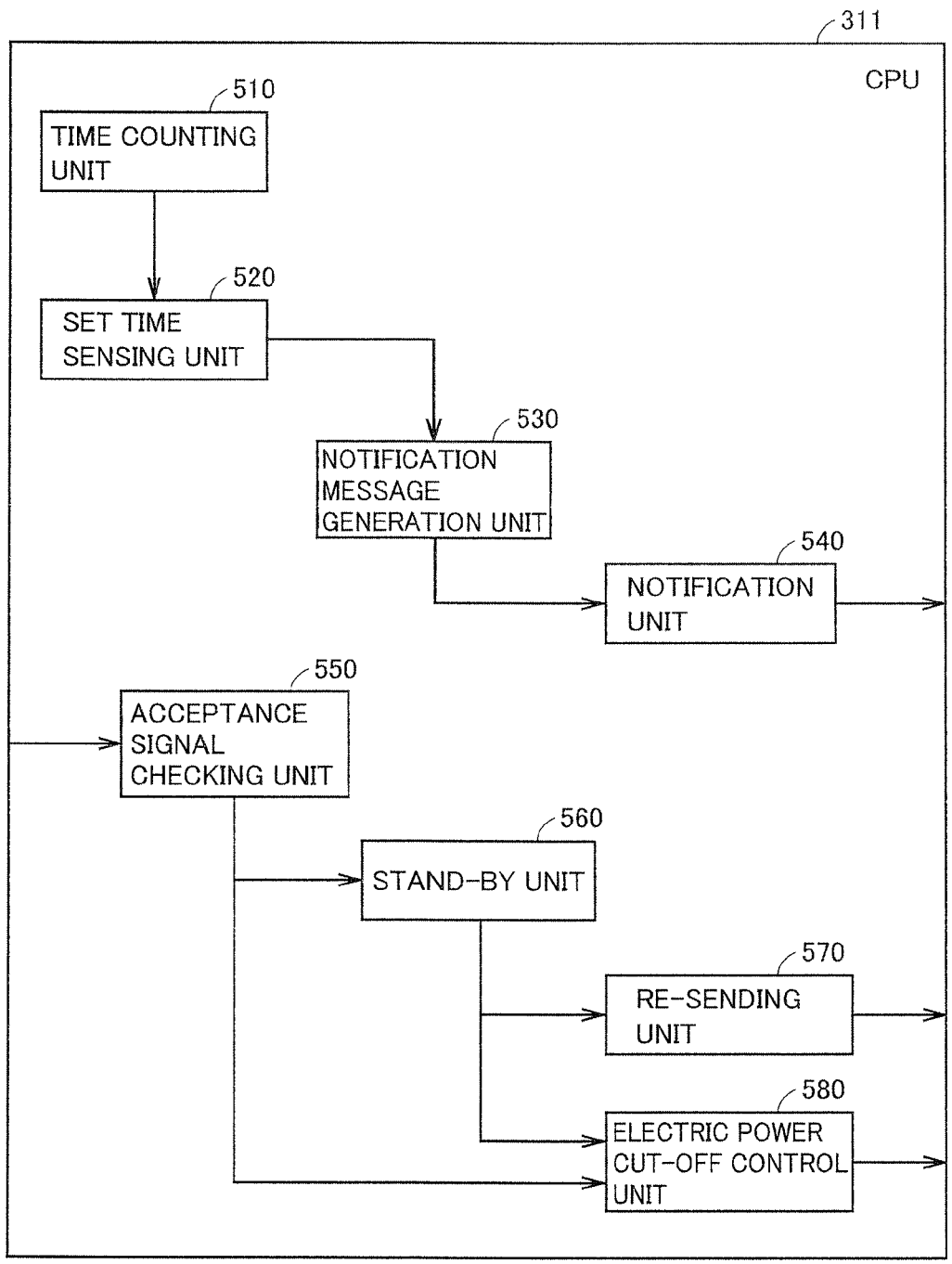
FIG. 5 is a block diagram illustrating a configuration of a function attained by a CPU 311.

Referring next to FIG. 5, CPU 311 implementing PLC adapter 300 according to the present embodiment will be described. FIG. 5 is a block diagram illustrating a configuration of a function realized by CPU 311. CPU 311 includes a time counting unit 510, a set time sensing unit 520, a notification message generation unit 530, a notification unit 540, an acceptance signal checking unit 550, a stand-by unit 560, a re-sending unit 570, and an electric power cut-off control unit 580.

Time counting unit 510 obtains time information in PLC adapter 300. For example, time counting unit 510 is implemented by an internal clock of CPU 311. Set time sensing unit 520 senses whether the internal time of PLC adapter 300 indicates a power saving start time (memory area 420) or not. Notification message generation unit 530 generates a message for confirming start of an operation for power saving, in response to sensing that the power saving start time has come. Notification unit 540 transmits the message generated by notification message generation unit 530 to information communication device 110.

Acceptance signal checking unit 550 checks whether an acceptance signal with regard to cut-off of electric power or execution of the power saving mode has been received from the signal provided to PLC adapter 300 or not. Stand-by unit 560 withholds processing during a time period defined in advance, in accordance with a result of checking by acceptance signal checking unit 550. Re-sending unit 570 transmits again the message generated by notification message generation unit 530 to information communication device 110, after withholding of processing by stand-by unit 560. Electric power cut-off control unit 580 cuts off electric power supply for suppressing electric power consumption in PLC adapter 300, in accordance with a result of checking by acceptance signal checking unit 550. Alternatively, electric power cut-off control unit 580 generates a command to switch from the mode of electric power consumption to the power saving mode and transmits the command to information communication device 110.

The function shown in FIG. 5 is realized by execution of the electric power control program (memory area 450) by CPU 311. In another aspect, control of PLC adapter 300 according to the present embodiment can be realized by combination of circuit elements performing specific processing, that is, by hardware.

Figure 6:
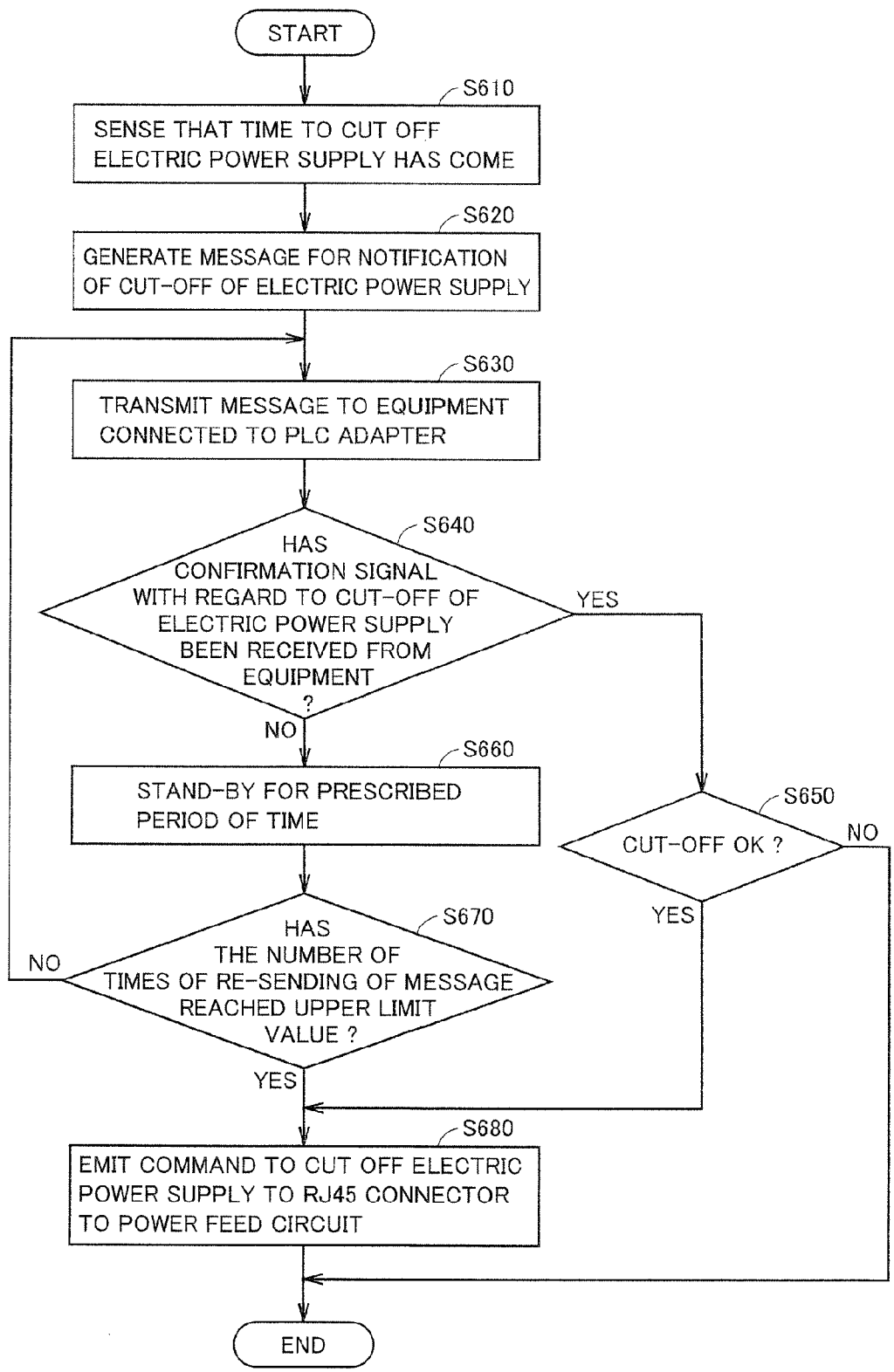
FIG. 6 is a flowchart illustrating a part of a series of operations performed by CPU 311.

Referring to FIG. 6, a control structure of PLC adapter 300 will be described. FIG. 6 is a flowchart illustrating a part of a series of operations performed by CPU 311 included in PLC adapter 300. These operations are realized by execution of the electric power control program (memory area 450) described previously.

In step S610, CPU 311 senses that the time to cut off electric power supply (the power saving start time, memory area 420) has come, based on the internally obtained time. In step S620, CPU 311 generates a message notifying that electric power supply will be cut of In step S630, CPU 311 transmits the generated message to equipment connected to PLC adapter 300 (such as information communication device 110).

In step S640, CPU 311 determines whether a confirmation signal with regard to electric power supply cut-off was received from the equipment or not. When CPU 311 determines that the signal was received (YES in step S640), CPU 311 switches control to step S650. Otherwise (NO in step S640), CPU 311 switches control to step S660.

In step S650, CPU 311 determines whether electric power supply cut-off can be carried out or not. This determination is made based on contents in a code included in the signal received in step S640. When CPU 311 determines that cut-off can be carried out (YES in step S650), CPU 311 switches control to step S680. Otherwise (NO in step S650), the process ends.

In step S660, CPU 311 withholds execution of a command for a prescribed time period defined in advance. In step S670, CPU 311 determines whether the number of times of re-sending of the message notifying that electric power supply will be cut off has reached the upper limit value or not. Specifically, CPU 311 causes RAM 313 to store transmission history in a memory area secured therein, each time the message is transmitted to the equipment. CPU 311 determines whether the number of times of re-sending has reached the upper limit value or not by successively referring to the value in that area. When CPU 311 determines that the number of times of re-sending has reached the upper limit value (YES in step S670), CPU 311 switches control to step S680. Otherwise (NO in step S670), CPU 311 returns control to step S630.

In step S680, CPU 311 emits a command to cut off electric power supply to RJ45 connector 360 to power feed circuit 332. Power feed circuit 332 stops supply of electric power supplied from AC-DC conversion power supply circuit 331 to RJ45 connector 360, in accordance with the command. This stopping operation is realized, for example, by opening a switch provided between RJ45 connector 360 and AC-DC conversion power supply circuit 331. Alternatively, in another aspect, power feed circuit 332 switches a supply pattern such that electric power defined in advance as electric power lower than electric power to be supplied during a normal operation is supplied. In this case, a value of a voltage output to a specific element is lowered.

Figure 7:
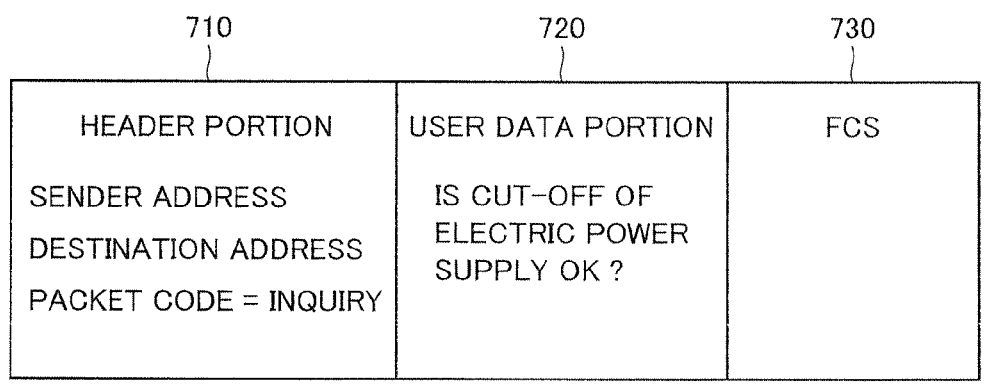
FIG. 7 is a diagram conceptually illustrating a configuration of a packet 700 transmitted from PLC adapter 300 to an information communication device 110.

Referring next to FIG. 7, communication between PLC adapter 300 and information communication device 110 will be described. FIG. 7 is a diagram conceptually illustrating a configuration of a packet 700 transmitted from PLC adapter 300 to information communication device 110. Packet 700 includes a header portion 710, a user data portion 720, and an FCS (Frame Check Sequence) 730.

Header portion 710 includes data for specifying a sender of packet 700 (for example, a sender address or a sender ID), a destination address of packet 700, and a packet code. The packet code includes data specifying contents in packet 700. User data portion 720 includes a message for checking with information communication device 110 whether electric power cut-off can be carried out or not. FCS 730 includes data for checking whether packet 700 has normally been transmitted or not.

When PLC adapter 300 transmits packet 700, information communication device 110 that received packet 700 analyzes the message included in user data portion 720 by referring to the packet code (header portion 710). Thereafter, information communication device 110 generates an answer to the message and replies to PLC adapter 300.

Figure 8:
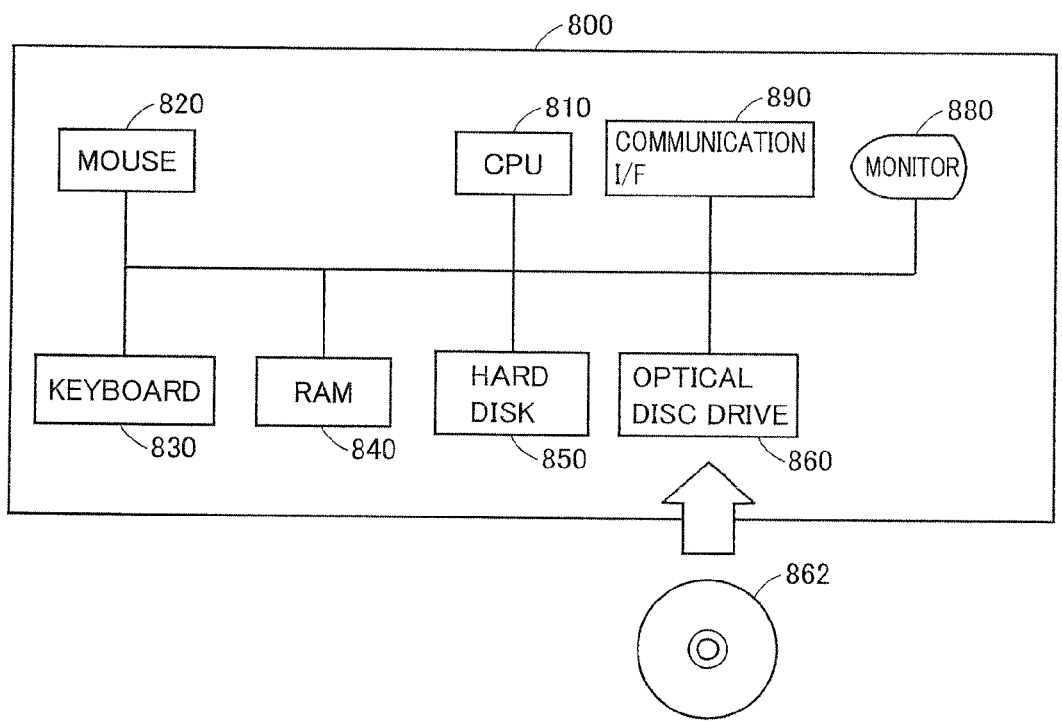
FIG. 8 is a block diagram illustrating a hardware configuration of a computer system 800 functioning as information communication device 110.

Referring now to FIG. 8, one form of a specific configuration of information communication device 110 according to the embodiment of the present invention will be described. FIG. 8 is a block diagram illustrating a hardware configuration of a computer system 800 functioning as information communication device 110.

Computer system 800 includes, as main components, a CPU 810 for executing a command based on a program, a mouse 820 and a keyboard 830 for accepting an input of an instruction from a user of computer system 800, a RAM 840 for temporarily storing data generated as a result of execution of a program by CPU 810 or data input through mouse 820 or keyboard 830, a hard disk 850 for storing data in a non-volatile manner, an optical disc drive 860 for driving a CD-ROM and other optical discs 862, a monitor 880, and a communication I/F (Interface) 890.

It is noted that exemplary information communication device 110 is not limited to computer system 800, and any equipment such as a television, a motion picture recording and reproduction apparatus and others having a communication function may be employed. Alternatively, equipment such as an air-conditioner, a light fixture, a surveillance camera, and others supplied with electric power through a wall outlet and having a communication function may be employed.

Figure 9:
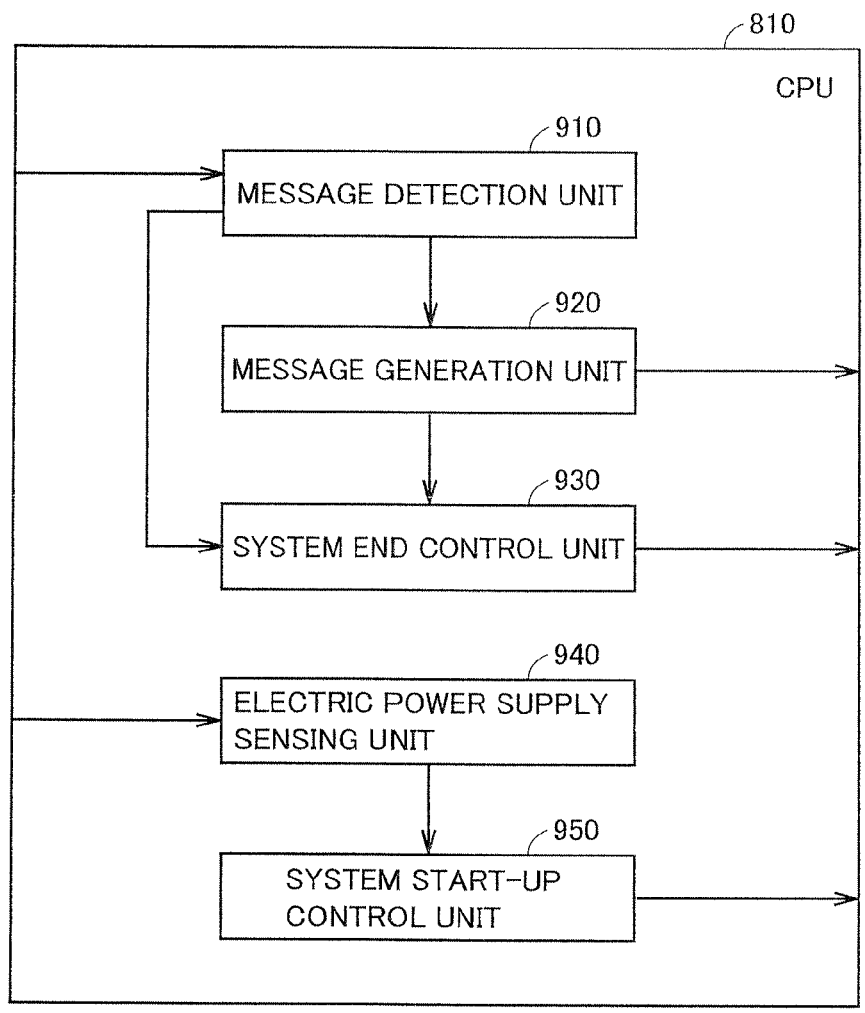
FIG. 9 is a block diagram illustrating a configuration of a function attained by a CPU 810.

Referring next to FIG. 9, CPU 810 implementing computer system 800 will be described. FIG. 9 is a block diagram illustrating a configuration of a function attained by CPU 810. CPU 810 includes a message detection unit 910, an acceptance message generation unit 920, a system end control unit 930, an electric power supply sensing unit 940, and a system start-up control unit 950.

Message detection unit 910 detects a message defined in advance with regard to cut-off of electric power supply, from packet 700 sent from PLC adapter 300.

Acceptance message generation unit 920 generates a message indicating whether or not to accept electric power cut-off in computer system 800. When cut-off is accepted, acceptance message generation unit 920 transmits a message containing data to that effect to PLC adapter 300. Alternatively, when cut-off is not accepted, acceptance message generation unit 920 transmits a message to that effect to PLC adapter 300.

System end control unit 930 carries out control for lowering electric power supplied to the inside of computer system 800 to electric power during a stand-by mode in response to cut-off of electric power supply. When this control is carried out, computer system 800 enters an external command stand-by state. Thereafter, when a start-up command is provided to computer system 800, computer system 800 starts again the operation in response to the command. Thereafter, computer system 800 can operate based on a normal operation voltage.

Electric power supply sensing unit 940 senses electric power supply to computer system 800 based on the command provided to computer system 800. Specifically, computer system 800 senses reception of electric power supply through RJ45 connector 360.

System start-up control unit 950 performs processing for operating computer system 800, in accordance with a result of sensing by electric power supply sensing unit 940. Specifically, CPU 810 functioning as system start-up control unit 950 issues a command for switching from the stand-by state to the normal operation mode in each piece of hardware (FIG. 8) and causes each component to operate with a normal operation voltage.

Figure 10:
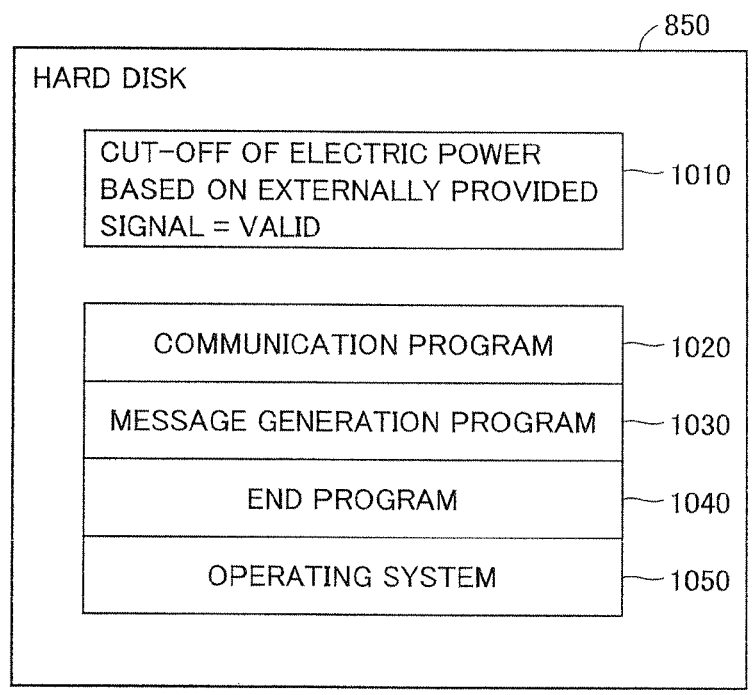
FIG. 10 is a diagram conceptually illustrating one form of storage of data in a hard disk 850 of computer system 800.

Referring next to FIG. 10, a data structure of computer system 800 will be described. FIG. 10 is a diagram conceptually illustrating one form of storage of data in hard disk 850. Hard disk 850 includes a plurality of memory areas for storing data.

Data defining whether cut-off of electric power based on an externally provided signal is valid or not is stored in a memory area 1010. A communication program for allowing computer system 800 to communicate with another information communication device (such as PLC adapter 300) is stored in a memory area 1020. A program for generating a message indicating an answer to cut-off of supplied electric power (acceptance or rejection) is stored in a memory area 1030. An end program for ending the operation of computer system 800 is stored in a memory area 1040. An operating system realizing a basic operation of computer system 800 is stored in a memory area 1050.

The data structure shown in FIG. 10 is realized as setting selected by the user of computer system 800 from among configurations prepared in advance by a manufacturer of computer system 800. In addition, setting defining power saving is not limited to the data shown in FIG. 10. Other than the data defining validity and invalidity of cut-off of electric power, time data defining cut-off during a specific time period or other detailed setting data may be used.

In addition, the data shown in FIG. 10 is not fixed and it may be changed. For example, the set value may be changed by user's input of other data into computer system 800.

Figure 11:
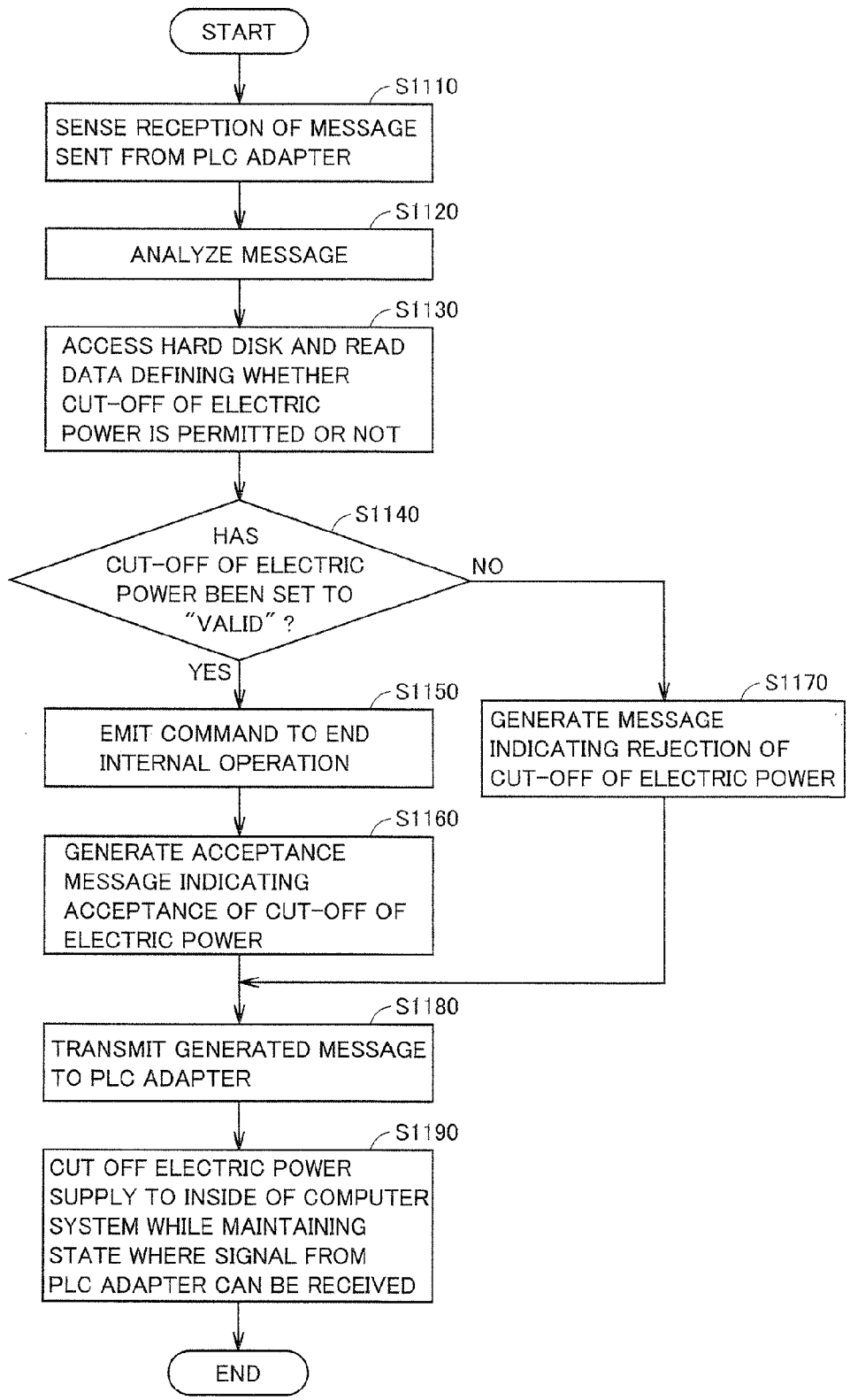
FIG. 11 is a flowchart illustrating a part of a series of operations performed by CPU 810 of computer system 800.

Referring next to FIG. 11, a control structure of computer system 800 according to the present embodiment will be described. FIG. 11 is a flowchart illustrating a part of a series of operations performed by CPU 810 of computer system 800.

In step S1110, CPU 810 senses reception of a message from PLC adapter 300 based on a signal sent through communication I/F 890. In step S1120, CPU 810 analyzes contents in the message. In step S1130, CPU 810 accesses hard disk 850 based on a result of analysis and reads data defined in connection with electric power cut-off (memory area 1010) from hard disk 850 to RAM 840.

In step S1140, CPU 810 determines whether electric power cut-off has been set as valid or not, based on the read data. When CPU 810 determines that electric power cut-off has been set as valid (YES in step S1140), CPU 810 switches control to step S1150. Otherwise (NO in step S1140), CPU 810 switches control to step S1170.

In step S1150, CPU 810 emits a command for ending an internal operation of computer system 800 to each component. Specifically, CPU 810 ends the operation of the hardware by executing the end program (memory area 1040). For example, illuminance of a backlight (not shown) of monitor 880 is lowered to a level in accordance with the power saving mode. Alternatively, the backlight is temporarily turned off.

In step S1160, CPU 810 generates an acceptance message indicating acceptance of electric power cut-off. Specifically, CPU 810 generates the message by executing a message generation program (memory area 1030). In step S1170, CPU 810 generates a message indicating rejection of electric power cut-off. This generation operation is also realized by executing the message generation program.

In step S1180, CPU 810 transmits the generated message to PLC adapter 300, In step S1190, CPU 810 cuts off electric power supply to the inside of computer system 800 while maintaining a state in which a signal from PLC adapter 300 can be received.

Thus, computer system 800 having the power saving function switches the operation mode to the operation mode adapted to power saving, in response to the signal from PLC adapter 300.

Figure 12:
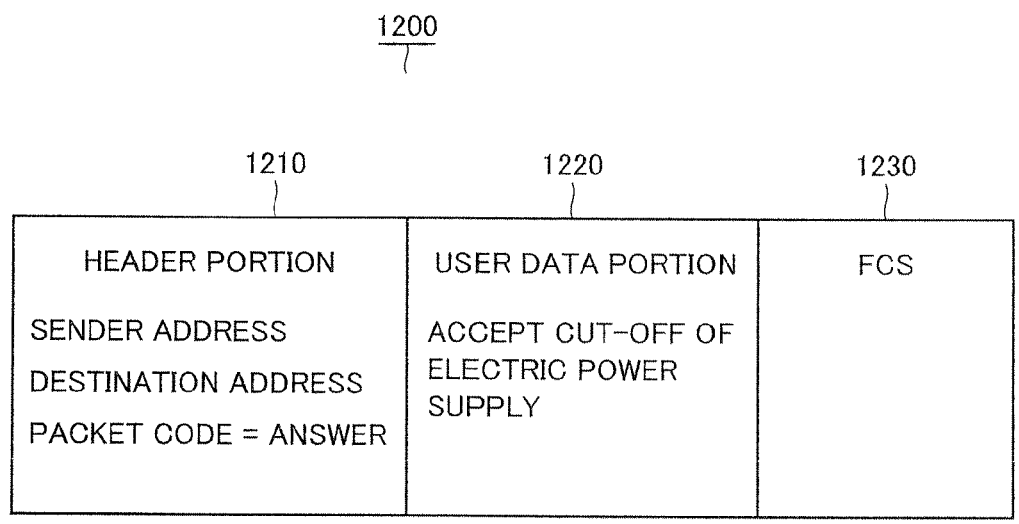
FIG. 12 is a diagram conceptually illustrating a configuration of a packet 1200 transmitted from computer system 800 to PLC adapter 300.

Referring now to FIG. 12, communication between computer system 800 and PLC adapter 300 will be described. FIG. 12 is a diagram conceptually illustrating a configuration of a packet 1200 transmitted from computer system 800 to PLC adapter 300. Packet 1200 includes a header portion 1210, a user data portion 1220, and an FCS 1230.

Header portion 1210 includes a sender address, a destination address, and a packet code. The sender address specifies a sender of packet 1200 (that is, computer system 800). The destination address specifies a receiver of packet 1200 (that is, PLC adapter 300). Instead of each address, an identification name unique to each piece of equipment may be used. The packet code indicates an answer to the message included in packet 700.

User data portion 1220 includes a message specifically defined in accordance with the packet code. For example, packet 1200 includes data indicating "acceptance of cut-off of electric power supply." FCS 1230 includes data similar to the data included in FCS 730.

Figure 13:
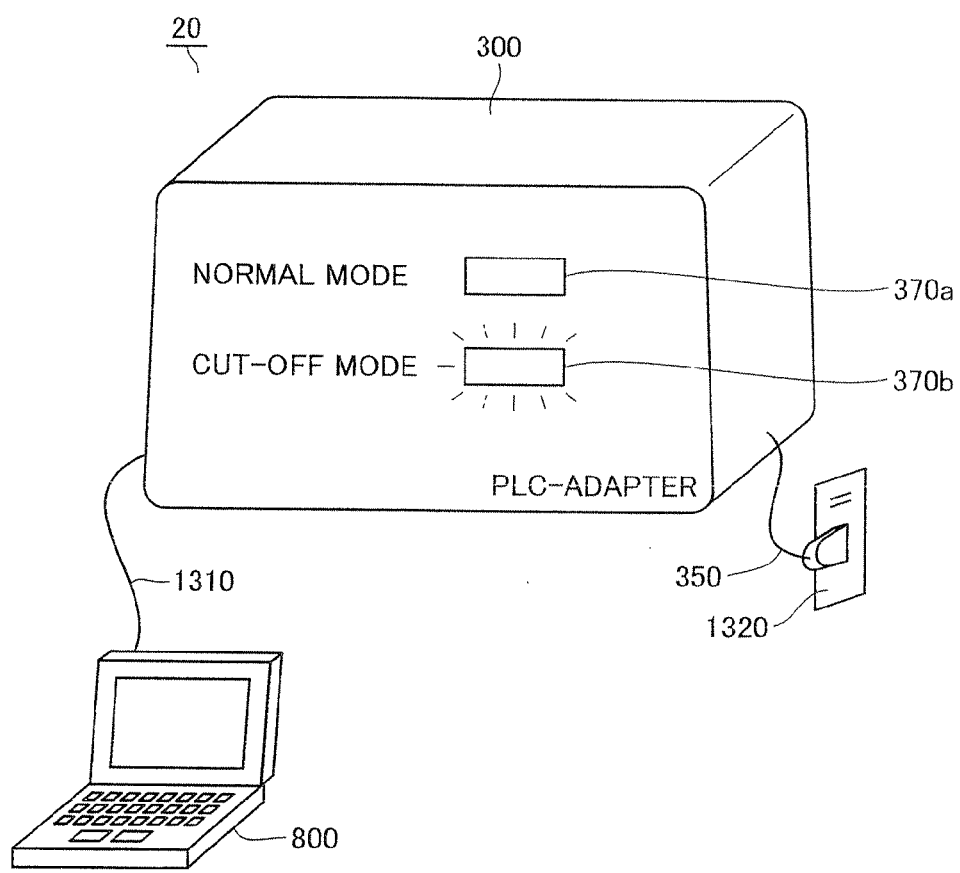
FIG. 13 is a diagram illustrating a configuration of a communication system 20 including PLC adapter 300 and computer system 800.

Referring now to FIG. 13, a specific operation of PLC adapter 300 according to the present embodiment will be described. FIG. 13 is a diagram illustrating a configuration of a communication system 20 including PLC adapter 300 and computer system 800.

PLC adapter 300 and computer system 800 are connected to each other through a cable 1310. Plug 350 is inserted in a wall outlet 1320 provided in a wall of a room where communication system 20 is installed. PLC adapter 300 receives electric power supply through wall outlet 1320. In addition, in the network using the power line, the signal is transmitted through plug 350. For example, PLC adapter 300 supplies the signal sent from computer system 800 further to the power line through plug 350.

Here, when the internal time in PLC adapter 300 indicates the time set in advance (memory area 420), PLC adapter 300 communicates with computer system 800 and starts electric power cut-off. In this case, in PLC adapter 300, an LED 370b indicating a "cut-off mode" blinks. Thereafter, when the power saving end time (memory area 430) comes, PLC adapter 300 supplies electric power supplied through wall outlet 1320 to computer system 800. Here, an LED 370a is turned on and notifies that PLC adapter 300 is in the normal mode. Here, LED 370b is turned off.

As described above, according to PLC adapter 300 in the present embodiment, when the time to operate in the power saving mode comes, a value of voltage supplied to the inside of PLC adapter 300 is lowered. Specifically, the voltage is lowered from the normal operation voltage to the operation voltage defined in advance for power saving. Thus, electric power consumption in PLC adapter 300 is suppressed. Here, if an operation voltage sufficient for allowing sensing of an external input is provided to PLC adapter 300, subsequent processing for switching to the normal mode as the time to end the power saving mode comes is smoothly performed.

Alternatively, in another aspect, electric power supplied to information communication device 110 connected to PLC adapter 300 is lowered. For example, a voltage value or a current value is lowered. When information communication device 110 can operate in the power saving mode, information communication device 110 temporarily enters a stand-by state as the power saving mode by PLC adapter 300 is started, so that electric power consumption is suppressed. Thereafter, when PLC adapter 300 transmits a signal to supply an output for the normal operation mode to information communication device 110, information communication device 110 can operate with the normal operation voltage and its original function (such as operation processing by CPU 810) is attained. Thus, a power line communication device capable of achieving suppression of electric power consumption can be provided.

<Variation>

A variation of the present embodiment will be described hereinafter. PLC adapter 300 according to the present variation is different from PLC adapter 300 according to the embodiment described previously in performing processing for switching the operation mode from the normal mode to the power saving mode, instead of cutting off electric power supply. It is noted that PLC adapter 300 according to the present variation has a configuration the same as shown in FIG. 3. Therefore, description thereof will not be repeated here.

Figure 14:
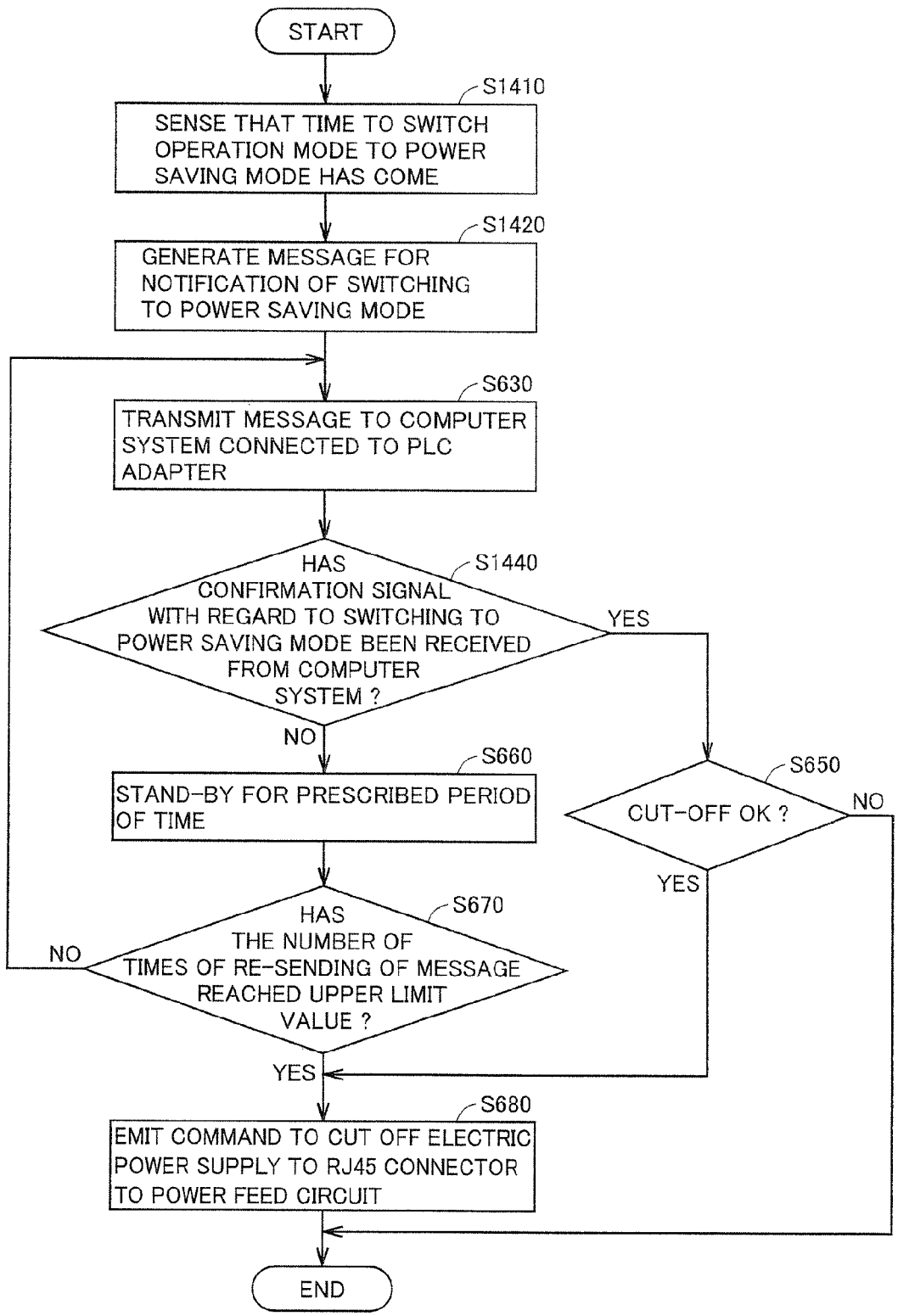
FIG. 14 is a flowchart illustrating a part of a series of operations performed by a CPU 310 implementing PLC adapter 300 according to a variation of a first embodiment of the present invention.

Referring to FIG. 14, a control structure of PLC adapter 300 according to the present variation will be described. FIG. 14 is a flowchart illustrating a part of a series of operations performed by a CPU 310 implementing PLC adapter 300 according to the present variation. It is noted that the processing the same as described previously has the same step number allotted, and hence description of the same operation will not be repeated here.

In step S1410, CPU 310 senses that the time to switch the operation mode to the power saving mode has come, based on the internal time. In step S1420, CPU 310 generates a message notifying that the operation mode will be switched to the power saving mode. In step S630, CPU 310 transmits the message to computer system 800.

In step S1440, CPU 310 determines whether a confirmation signal with regard to switching to the power saving mode was received from computer system 800 or not. For example, this determination is made based on the packet code included in packet 1200 sent from computer system 800. When CPU 310 determines that such a signal was received (YES in step S1440), CPU 310 switches control to step S650. Otherwise (NO in step S1440), CPU 310 switches control to step S660. Thereafter, CPU 310 performs processing similar to the processing described previously (steps S650 to S680).

Second Embodiment

A second embodiment of the present invention will be described hereinafter. A network device according to the present embodiment is different from network device 100 according to the first embodiment described previously in having a function to suppress electric power in accordance with an amount of internally transmitted data or a function to cut off electric power supply.

Figure 15:
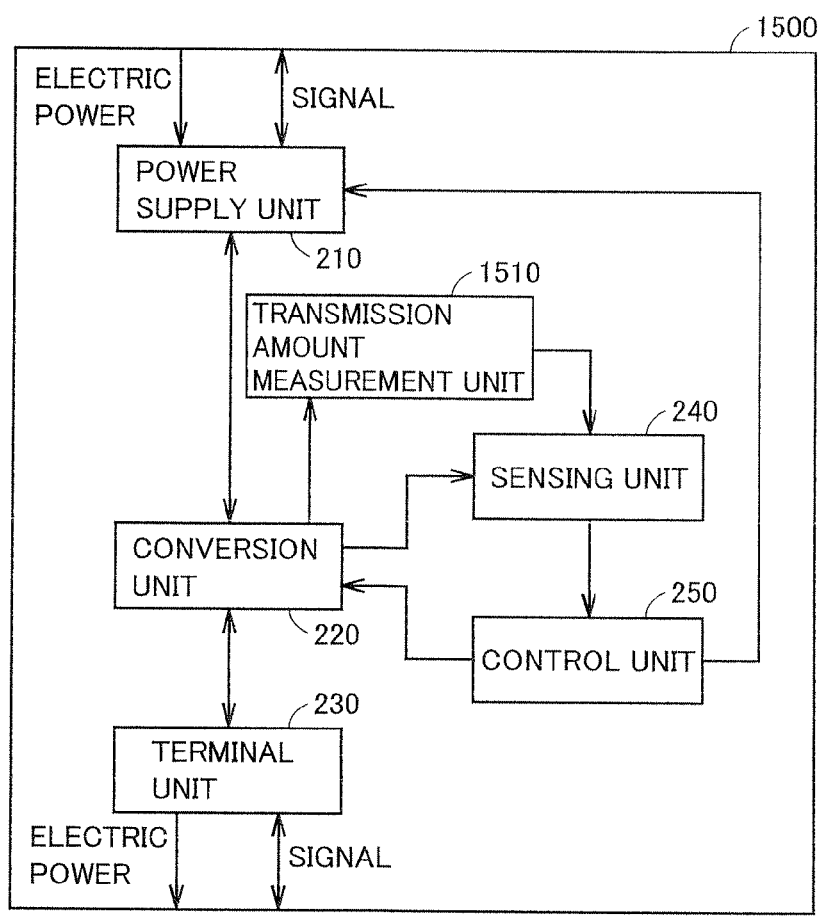
FIG. 15 is a block diagram illustrating a configuration of a function realized by a network device 1500 according to a second embodiment of the present invention.

Referring now to FIG. 15, a configuration of a network device 1500 according to the present embodiment will be described. FIG. 15 is a block diagram illustrating a configuration of a function realized by network device 1500. Network device 1500 further includes a transmission amount measurement unit 1510 in addition to the components shown in FIG. 2.

Transmission amount measurement unit 1510 is connected to conversion unit 220 and measures an amount of data transmitted through conversion unit 220. In one aspect, transmission amount measurement unit 1510 measures the amount of data transmitted from terminal unit 230 to power supply unit 210. In another aspect, transmission amount measurement unit 1510 measures the amount of data transmitted from power supply unit 210 to terminal unit 230.

Sensing unit 240 senses that the condition for starting the operation to suppress electric power consumption in network device 1500 is satisfied, based on a result of measurement by transmission amount measurement unit 1510. More specifically, sensing unit 240 senses that the condition is satisfied, based on the fact that the amount of data passing through conversion unit 220 is lower than a prescribed amount within a time period defined in advance. In another aspect, sensing unit 240 senses that the condition is satisfied, based on the fact that the amount of data sent from terminal unit 230 to power supply unit 210 attained to "0" within a time period defined in advance.

Control unit 250 starts processing for suppressing electric power consumption in network device 1500 based on a result of sensing by sensing unit 240.

Figure 16:
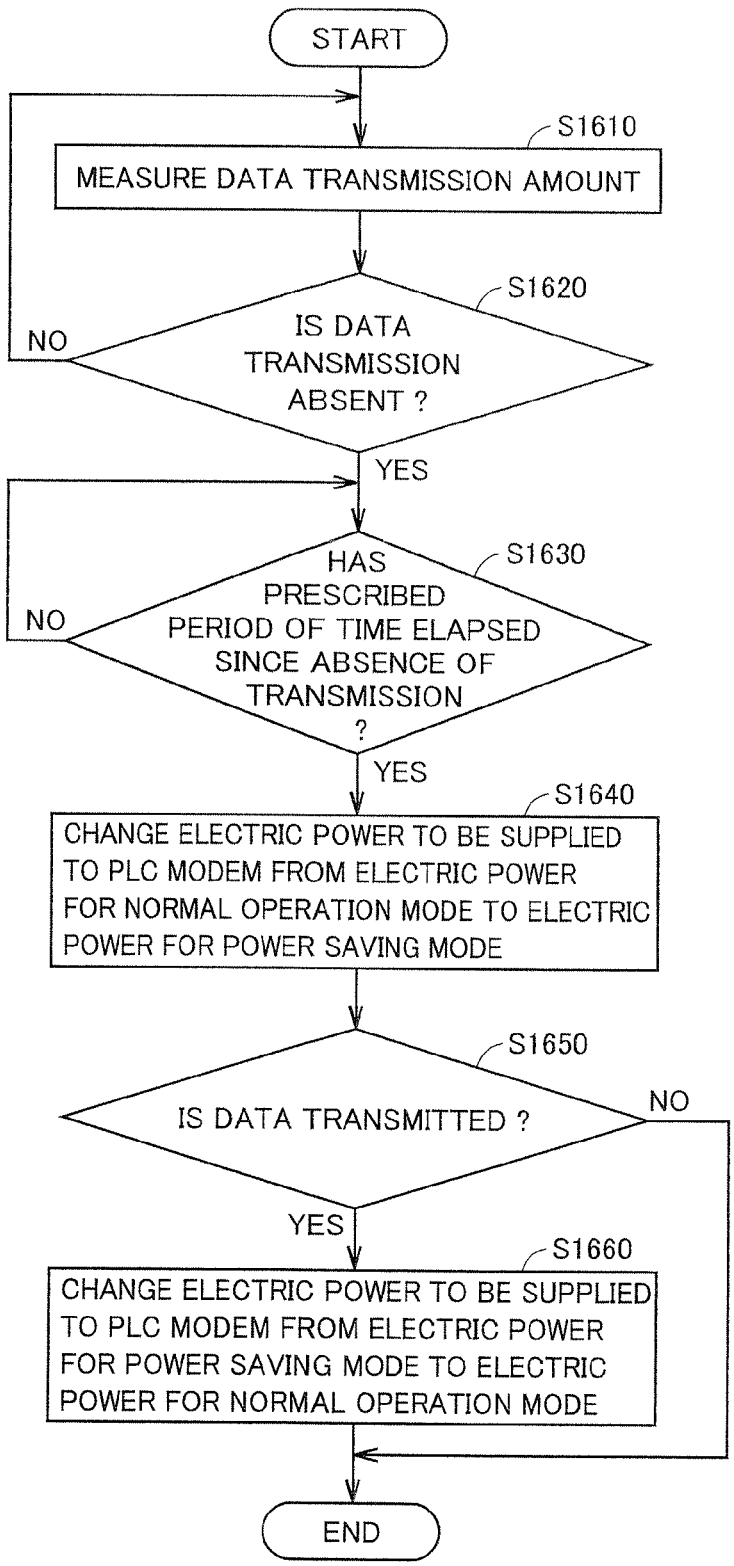
FIG. 16 is a flowchart illustrating a part of a series of operations performed by CPU 311 implementing network device 1500 according to the second embodiment of the present invention.

Referring now to FIG. 16, a control structure of network device 1500 according to the present embodiment will be described. It is noted that network device 1500 according to the present embodiment is implemented, for example, as PLC adapter 300 shown in FIG. 3. Accordingly, description will be given hereinafter, assuming that the operation of network device 1500 below is realized under the control of CPU 311 of PLC adapter 300.

In step S1610, CPU 311 measures the amount of transmission of data transmitted in PLC adapter 300, based on the output from PLC modem 321.

In step S1620, CPU 311 determines whether transmission of data is absent within a time period defined in advance or not. When CPU 311 determines that transmission of data is absent (YES in step S1620), CPU 311 switches control to step S1630. Otherwise (NO in step S1620), CPU 311 returns control to step S1610.

In step S1630, CPU 311 determines whether a prescribed time period has elapsed since absence of data transmission. This determination is made based on the time obtained from the internal clock of CPU 311. When CPU 311 determines that a prescribed time period has elapsed (YES in step S1630), CPU 311 switches control to step S1640. Otherwise (NO in step S1630), CPU 311 withholds processing for a prescribed time period and switches control again to step S1630.

In step S1640, CPU 311 changes electric power to be supplied to PLC modem 321 from electric power for the normal operation mode to electric power for the power saving mode. More specifically, CPU 311 provides a command to power feed circuit 332 such that a voltage to such an extent as sufficient for ensuring a minimal operation of PLC modem 321 is supplied. Here, the minimal operation includes conversion of a signal and sensing of contents in the signal by PLC modem 321. The contents in the signal are, for example, a command indicating recovery from the power saving mode to the normal mode. When this command is detected, network device 1500 can perform a normal function.

In step S1650, CPU 311 determines whether data is transmitted or not, based on the output from PLC modem 321. When CPU 311 determines that data is transmitted (YES in step S1650), CPU 311 switches control to step S1660. Otherwise (NO in step S1650), CPU311 ends control.

In step S1660, CPU 311 changes electric power to be supplied to PLC modem 321 from electric power for the power saving mode to electric power for the normal operation mode. More specifically, CPU 311 raises the voltage value for PLC modem 321 to the voltage value ensuring the normal operation.

As described above, according to network device 1500 in the present embodiment, when a prescribed period of time has elapsed since absence of data transmission, the value of voltage supplied to the inside is changed to the value of operation voltage for power saving. Thereafter, when data transmission is sensed, a voltage for the normal operation is again supplied. Consequently, while communication is not carried out, electric power consumption is suppressed.

Third Embodiment

A third embodiment of the present invention will be described hereinafter. A network device 1700 according to the present embodiment is different from each embodiment described previously in having a function to switch to cut-off of electric power or to switch between the operation modes in response to an operation given to network device 1700.

Figure 17:
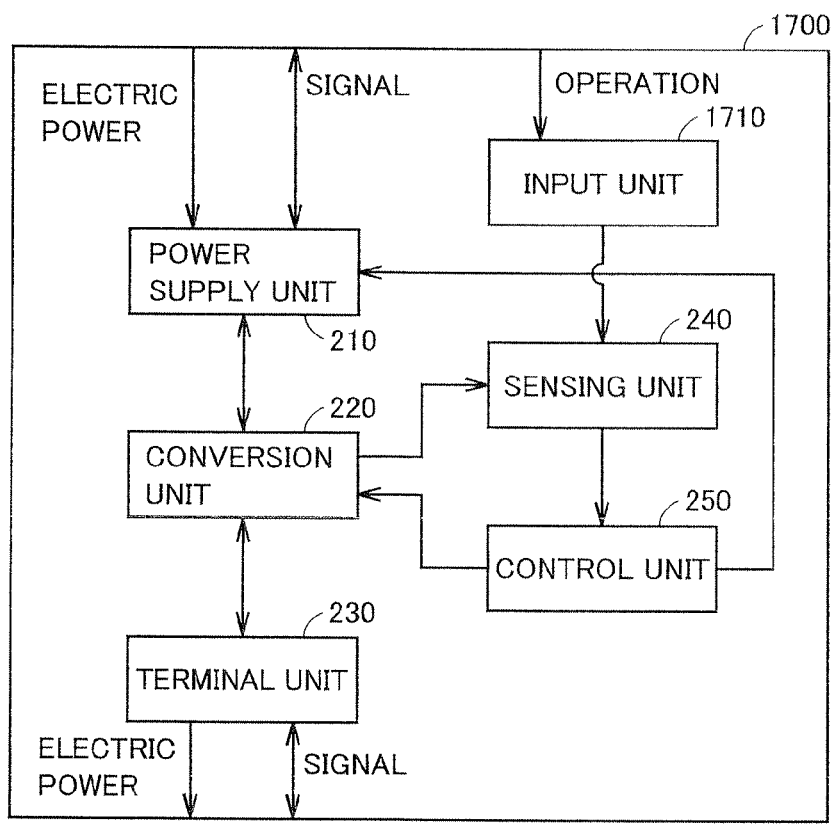
FIG. 17 is a block diagram illustrating a configuration of a function realized by a network device 1700 according to a third embodiment of the present invention.

Referring now to FIG. 17, a configuration of network device 1700 according to the present embodiment will be described. FIG. 17 is a block diagram illustrating a configuration of a function achieved by network device 1700. Network device 1700 further includes an input unit 1710 in addition to the components shown in FIG. 2. Input unit 1710 accepts an operation to network device 1700 and emits a signal in accordance with an operation to sensing unit 240.

In one aspect, input unit 1710 is implemented as a button, a touch panel, and other input interfaces provided on a front face of a housing of network device 1700.

When network device 1700 accepts an operation defined in advance for switching between supply and cut-off of electric power through input unit 1710, network device 1700 provides a command indicating electric power supply to terminal unit 230 or conversion unit 220 in accordance with the operation. Consequently, information communication device 110 (such as computer system 800) connected to network device 1700 switches between the operation modes. Alternatively, conversion unit 220 of network device 1700 switches to the mode in which it operates with a low voltage.

Thus, the user of network device 1700 can arbitrarily switch between the power saving mode and the normal mode, in accordance with the state of use. Therefore, electric power consumption is suppressed and convenience of network device 1700 can be improved.

Fourth Embodiment

A fourth embodiment of the present invention will be described hereinafter. A network device 1800 according to the present embodiment is different from each embodiment described previously in having a function to detect change in an environment where it is installed and to switch electric power supply in accordance with that change.

Figure 18:
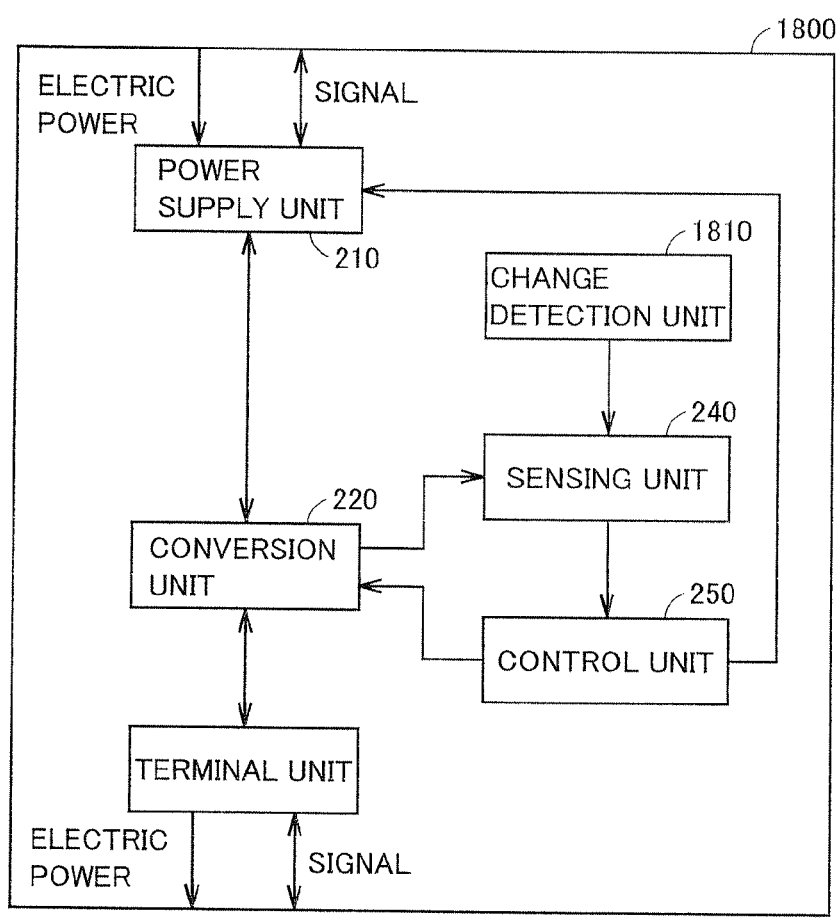
FIG. 18 is a block diagram illustrating a configuration of a function realized by a network device 1800 according to a fourth embodiment of the present invention.

Referring now to FIG. 18, a configuration of network device 1800 according to the fourth embodiment of the present invention will be described, FIG. 18 is a block diagram illustrating a configuration of a function realized by network device 1800. Network device 1800 further includes a change detection unit 1810 in addition to the components shown in FIG. 2.

Change detection unit 1810 detects change in an environment of network device 1800. In one aspect, change detection unit 1810 is implemented as a sensor for detecting a temperature. In another aspect, change detection unit 1810 is implemented as a sensor for detecting sound. In another aspect, change detection unit 1810 is also implemented as an infrared sensor. In yet another aspect, change detection unit 1810 may be a sensor for detecting brightness around network device 1800.

Sensing unit 240 is configured to operate based on an output from change detection unit 1810. Specifically, sensing unit 240 senses that the condition for starting the operation to suppress electric power consumption in network device 1800 is satisfied, based on the fact that a temperature around network device 1800 is equal to or lower than a temperature set in advance. For example, when a room temperature is lowered as a person exits from a room where network device 1800 is installed or as a heating appliance such as an air-conditioner or the like is turned off, sensing unit 240 senses that the condition is satisfied.

Alternatively, in summer, when an operation of a cooling apparatus such as an air-conditioner or the like ends, a room temperature increases. Here, sensing unit 240 senses that the condition is satisfied. Here, as an amount of heat generation from network device 1800 is suppressed, further increase in the room temperature can also be prevented.

In another aspect, sensing unit 240 senses that the condition is satisfied, based on the fact that the sound level around network device 1800 is equal to or lower than a level defined in advance. For example, when the user of information communication device 110 connected to network device 1800 is absent, there is no sound originating from manipulation of information communication device 110 and the sound level accordingly lowers.

Control unit 250 cuts off electric power supply or switches to the power saving mode in network device 1800, or notifies information communication device 110 of the power saving mode, based on the result of sensing.

Figure 19:
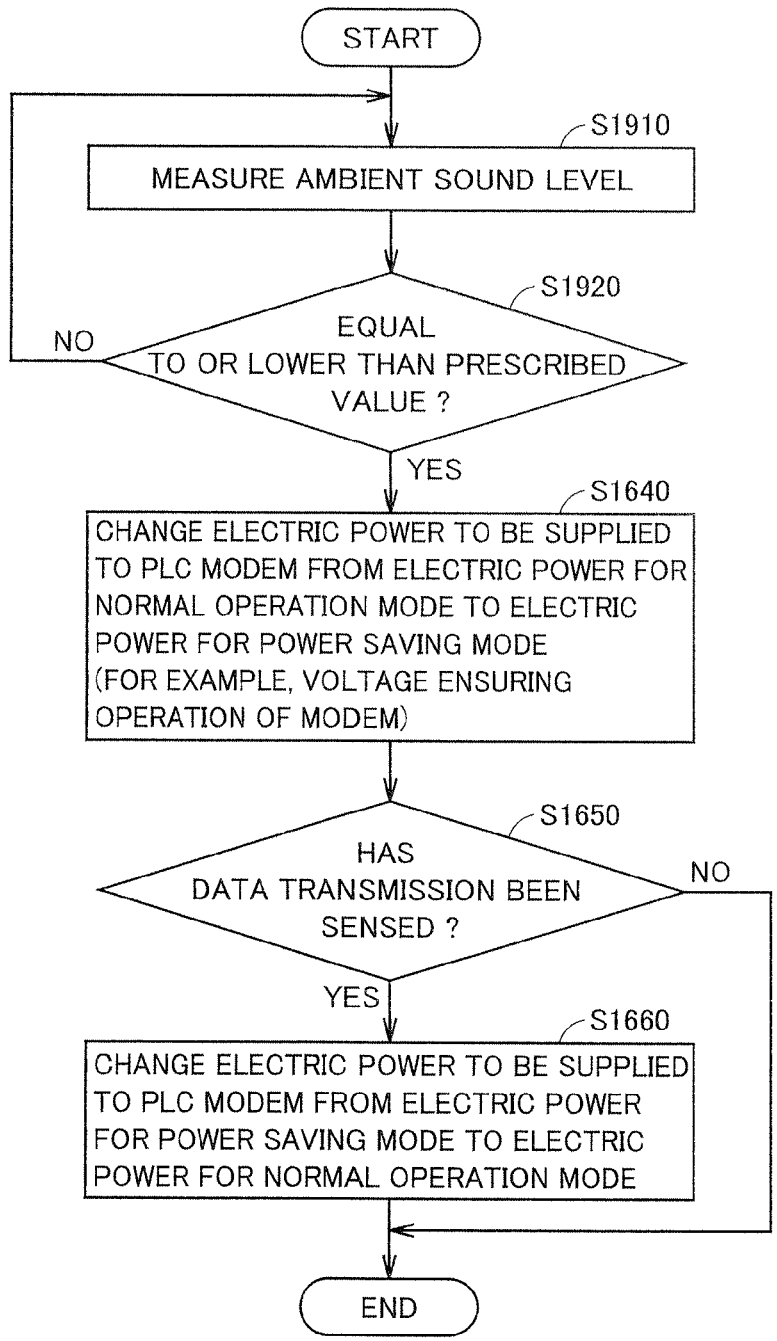
FIG. 19 is a flowchart illustrating a part of a series of operations performed by CPU 311 implementing network device 1800 according to the fourth embodiment of the present invention.

Referring now to FIG. 19, a control structure of network device 1800 according to the present embodiment will be described. Specifically, network device 1800 is implemented by further adding a temperature sensor or a sound sensor to the components in PLC adapter 300 shown in FIG. 3. Therefore, the description below will be given, assuming that network device 1800 is implemented based on the configuration shown in FIG. 3.

In step S1910, CPU 311 measures a sound level around PLC adapter 300 based on an output from a sound sensor (not shown). In step S1920, CPU 311 determines whether the sound level is equal to or lower than a value defined in advance or not. When CPU 311 determines that the ambient sound level is equal to or lower than the prescribed value (YES in step S1920), CPU 311 switches control to step S1640. Otherwise (NO in step S1920), CPU 311 returns control to step S1910. Thereafter, CPU 311 performs processing for switching electric power supply from the normal mode to the power saving mode (step S1640 to step S1660).

As described above, network device 1800 according to the present embodiment switches the operation mode in which electric power is consumed, by detecting change in the environment. As the environment of network device 1800 may vary in accordance with a condition of use of network device 1800, suppression of electric power consumption in accordance with a manner of use of network device 1800 is achieved.

Fifth Embodiment

A fifth embodiment of the present invention will be described hereinafter. A network device according to the present embodiment is different from each embodiment described previously in having a function to be able to suppress electric power consumption of a plurality of connected pieces of equipment.

Figure 20:
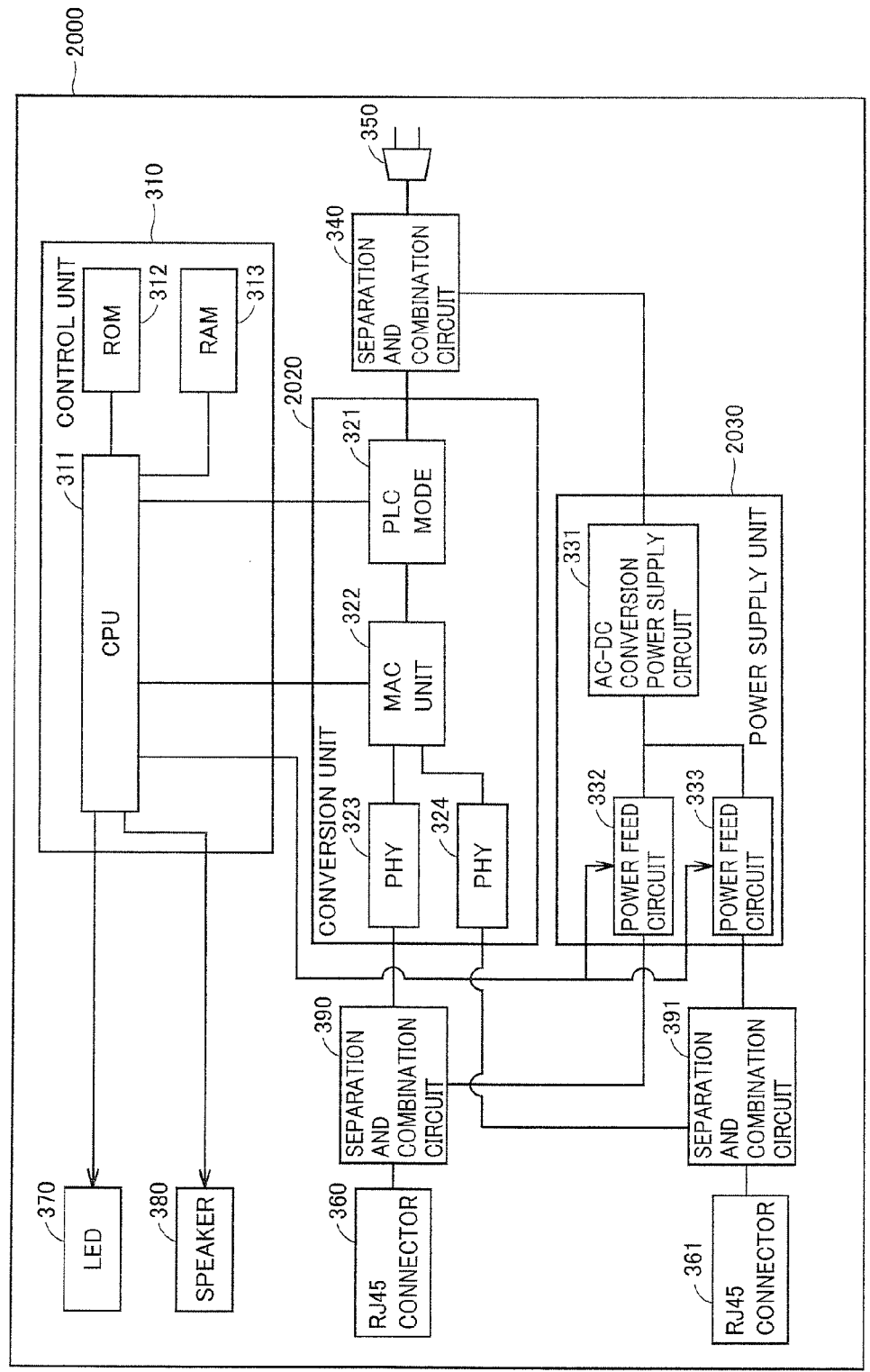
FIG. 20 is a block diagram illustrating a hardware configuration of a PLC adapter 2000 functioning as a network device according to a fifth embodiment of the present invention.

Referring now to FIG. 20, a configuration of a PLC adapter 2000 functioning as the network device according to the present embodiment will be described. FIG. 20 is a block diagram illustrating a hardware configuration of PLC adapter 2000. PLC adapter 2000 includes a conversion unit 2020 and a power supply unit 2030 instead of conversion unit 320 and power supply unit 330, in the configuration of PLC adapter 300 shown in FIG. 3. In addition, PLC adapter 2000 includes an RJ45 connector 361 and a separation and combination circuit 391, Conversion unit 2020 further includes a physical layer interface 324 in addition to the components included in conversion unit 320. Physical layer interface 324 is connected to MAC unit 322.

Power supply unit 2030 further includes a power feed circuit 333 in addition to the components included in power supply unit 330. Power feed circuit 333 is connected to AC-DC conversion power supply circuit 331. Power feed circuit 333 and power feed circuit 332 operate in response to a command from CPU 311. Physical layer interface 324 and power feed circuit 333 are connected to RJ45 connector 361 with separation and combination circuit 391 being interposed. RJ45 connector 361 accepts connection of a communication cable connected to another information communication device, as in the case of RJ45 connector 360.

CPU 311 included in PLC adapter 2000 switches control of electric power supply to the information communication device connected to RJ45 connector 360 or RJ45 connector 361, based on data stored in ROM 312.

Figure 21:
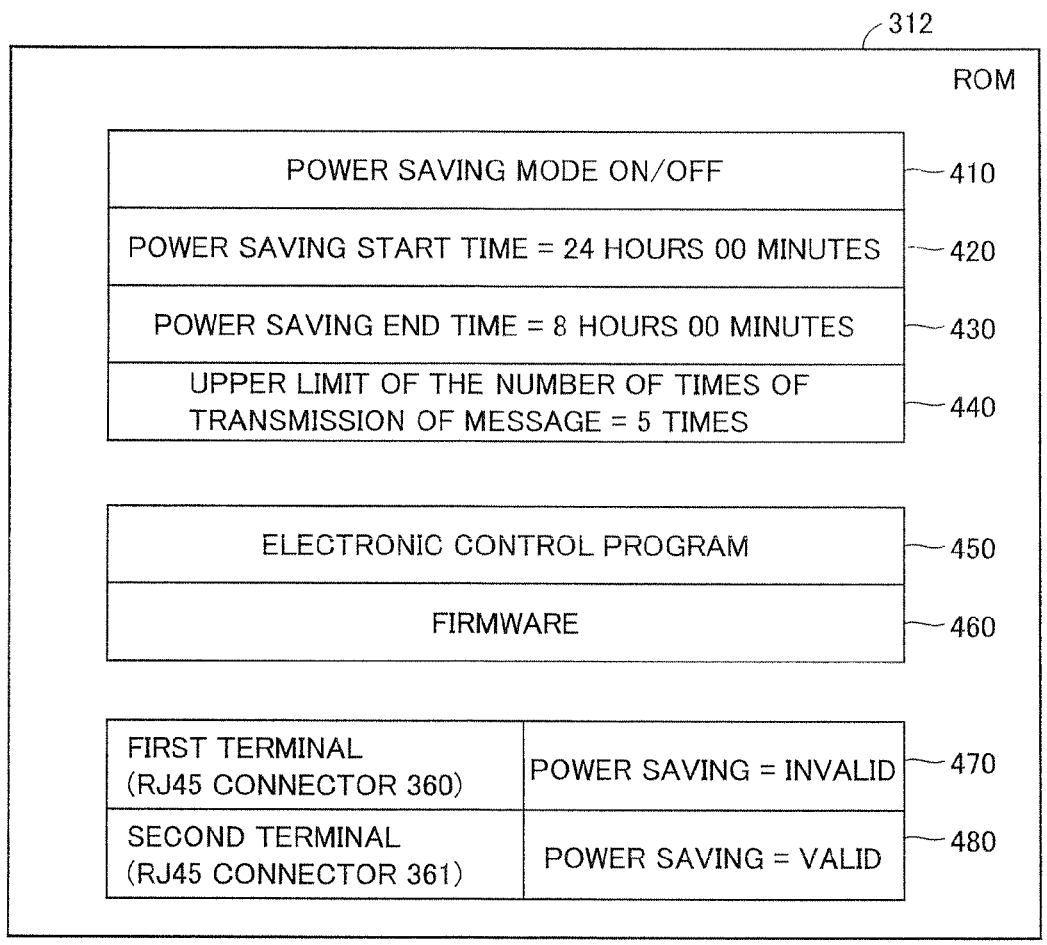
FIG. 21 is a diagram conceptually illustrating one form of storage of data in ROM 312 of PLC adapter 2000 according to the fifth embodiment of the present invention.

Referring now to FIG. 21, a data structure of PLC adapter 2000 according to the present embodiment will be described. FIG. 21 is a diagram conceptually illustrating one form of storage of data in ROM 312. ROM 312 further includes data for managing an operation of equipment connected to PLC adapter 2000. Specifically, data defining whether power saving of a first terminal (such as RJ45 connector 360) is "valid" or not is stored in a memory area 470. Data defining whether power saving of the information communication device connected to a second terminal (such as RJ45 connector 361) is "valid" or not is stored in a memory area 480.

Specifically, referring to FIG. 21, power saving is set as "invalid" for the information communication device connected to RJ45 connector 360. Power saving is set as "valid" for the information communication device connected to RJ45 connector 361. Therefore, CPU 311 can independently cut off electric power supply to each information communication device or switch to the power saving mode by referring to memory areas 470 and 480. In the example shown in FIG. 21, only equipment connected to RJ45 connector 361 is switched to the power saving mode.

Regarding the data defining switching between the modes or start or end of cut-off of electric power, data stored in memory areas 410 to 440 may be defined for each terminal. Here, switching between the modes is set in further detail. For example, the time to start and end the power saving mode can be made different for each information communication device.

As described above, according to PLC adapter 2000 in the present embodiment, flexible setting for power saving for each information communication device connected to PLC adapter 2000 can be made.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

The invention claimed is:

1. A power line communication device, comprising:
a power supply unit for receiving electric power supply through a power line and transmitting and receiving a signal;

a terminal unit for supplying said electric power to outside of said power line communication device and transmitting and receiving a signal;

a conversion unit for modulating and demodulating the signal transmitted between said power line and said terminal unit;

a sensing unit for sensing that a condition for starting an operation to suppress electric power consumption in said power line communication device is satisfied; and an electric power control unit for suppressing electric power consumption in said power line communication device when said condition is sensed to be satisfied, wherein said conversion unit operates in accordance with at least any of a first operation mode of operation without restriction on said electric power consumption and a second operation mode of operation under restriction on said electric power consumption, and said electric power control unit switches the operation mode of said conversion unit from said first operation mode to said second operation mode.

2. The power line communication device according to claim 1, wherein said electric power control unit generates a command for suppressing electric power consumption when said condition is sensed to be satisfied and emits said command to said terminal unit.

3. The power line communication device according to claim 1, wherein said electric power control unit cuts off electric power supply from said power supply unit to said terminal unit.

4. The power line communication device according to claim 1, further comprising a change detection unit for detecting change in an environment of said power line communication device, wherein said sensing unit senses whether said condition is satisfied based on detection of change in said environment by the change detection unit.

5. The power line communication device according to claim 4, wherein said change detection unit includes a sensor for detecting a temperature, and said sensing unit senses whether said condition is satisfied based on detection of temperature change in the environment of said power line communication device by the change detection unit.

6. The power line communication device according to claim 4, wherein said change detection unit includes a sensor for detecting sound, and said sensing unit senses whether said condition is satisfied based on whether a level of sound around said power line communication device is equal to or lower than a level defined in advance.

7. The power line communication device according to claim 1, further comprising a time counting unit for counting time, wherein said sensing unit senses whether said condition is satisfied based on the time counted by said time counting unit.

8. The power line communication device according to claim 7, wherein said sensing unit senses whether said condition is satisfied at every occurrence of a predetermined time.

9. The power line communication device according to claim 7, wherein said sensing unit senses whether said condition is satisfied during a predetermined time period.

10. The power line communication device according to claim 1, further comprising a transmission amount measurement unit for measuring an amount of data transmitted in said power line communication device, wherein said sensing unit senses whether said condition is satisfied based on change in the amount of transmission in said power line communication device.

11. The power line communication device according to claim 10, wherein said sensing unit senses whether said condition is satisfied based on absence of transmission of the data between said terminal unit and said conversion unit.

12. The power line communication device according to claim 11, wherein said sensing unit senses whether said condition is satisfied based on lapse of a predetermined prescribed time since absence of transmission of said data.

13. The power line communication device according to claim 1, further comprising an input unit for accepting a command to said power line communication device, wherein said sensing unit senses whether said condition is satisfied based on said command to suppress consumption being provided to said input unit.

14. The power line communication device according to claim 13, wherein said input unit further includes a manipulation unit for accepting manipulation of said power line communication device, and said sensing unit senses whether said condition is satisfied based on said manipulation being provided to said power line communication device.

15. The power line communication device according to claim 13, wherein said input unit includes a reception unit for receiving a signal to said power line communication device, and said sensing unit senses whether said condition is satisfied based on reception by said reception unit of a signal including said command to suppress electric power consumption.

16. The power line communication device according to claim 15, wherein said reception unit receives a signal transmitted through said power line.

17. The power line communication device according to claim 15, wherein said reception unit receives a signal input to said power line communication device through said terminal unit, received said signal includes information indicating that equipment receiving electric power supply through said terminal unit accepts suppression of electric power consumption, and said sensing unit senses whether said condition is satisfied based on reception of said information.

* * * * *